UNITED STATES PATENT OFFICE 2,461,942

VINYL CHLORIDE-ALKYL ESTER OF UNSATURATED DICARBOXYLIC ACID COPOLYMER SPONGE COMPOSITION

Walter T. L. Ten Broeck, Jr., Akron, Ohio, assignor to Wingfoot Corporation, Akron, Ohio, a corporation of Delaware No Drawing. Application July 23, 1946, Serial No. 685,783

4 Claims. (Cl. 260—30.6)

This invention relates to new light-weight soft vinyl chloride-alkyl ester of unsaturated dicarboxylic acid copolymer sponge compositions and to methods for their preparation from thermoplastic copolymers of vinyl chloride and esters of unsaturated dicarboxylic acids.

In the art of manufacturing artifical sponges the method of mixing and heating a plastic material with a substance which evolves a gas at elevated temperatures, is well known. This evolution of gas takes place at temperatures of 180 to 400° F. and is known as "blowing." This method, however, is limited in its use because the porous comopsitions should be flexible and soft at the lower temperatures at which they are used (60–130° F.), and yet they must be sufficiently plastic at the "blowing" temperatures to retain the porous structure. Many porous compositions may be plasticized to the required soft texture at the temperatures of normal use, but are too soft and fluid at the temperatures used to evolve the gases during fabrication. Polyvinyl chloride and the vinyl chloride copolymers are compounds usually having such unsuitable properties. Plasticizers, such as dibutyl sebacate and tricresyl phosphate, are usually added to vinyl chloride polymers in order to increase the softness and elasticity of the compositions, but such mixtures are too fluid at blowing temperatures. On the other hand, if the proportion of plasticizer is adjusted to yield a plastic composition at blowing temperatures, suitable for retaining the porous structure, the resulting porous products are too rigid for use as sponge substitutes.

In application Serial No. 649,735, filed February 23, 1946, by Walter T. L. Ten Broeck, Jr., there are described and claimed methods of preparing stiff and resilient porous compositions from polyvinyl chloride and vinyl chloride copolymers in which the properties of the vinyl chloride polymers are modified by incorporating substantial proportions of polyvinyl acetals. Such compositions have excellent compression resistance but are not suitable for sponge substitutes.

In U. S. Patent 2,386,995 there is described a method of avoiding the objectionable flabbiness of plasticized vinyl chloride polymers by adding the plasticizer in two separate increments, one at high temperatures in sufficient amount to render the composition suitable for blowing and the second introduced at lower temperatures so as to disperse it in such manner that its plasticizing effect is not attained until after the blowing operations by diffusion into the composition.

It is the primary purpose of this invention to produce blown sponge compositions from copolymers of vinyl chloride without resorting to the cumbersome procedure set forth in the above United States patent. It has been found that by using a certain class of vinyl chloride copolymers desirable soft sponge compositions may be prepared by mixing a plasticizer with the copolymer and blowing the sponge directly in the conventional manner. A further purpose of this invention is to prepare a light-weight elastic porous product having a uniform soft texture, and uniformly dispersed bubbles of a fixed gas, by a simple inexpensive method.

In accordance with this invention artificial sponges may be prepared from copolymers of vinyl chloride and from 2 to 25 percent of alkyl esters of ethylene alpha, beta-dicarboxylic acids and 75 to 98 percent of vinyl chloride. The preferred compositions are the copolymers of 5 to 20 per cent of diethyl fumarate, diethyl maleate, diethyl chloromaleate and 80 to 95 percent of vinyl chloride. The useful esters of ethylene alpha, beta-dicarboxylic acid are those set forth in the following structural formula

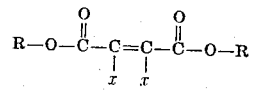

in which R is an alkyl radical and in which $x$ is an atom of the group consisting of hydrogen and chlorine.

The sponge-forming operations are conducted by inserting the vinyl chloride copolymer, having compounded therewith the plasticizer and a gas-evolving solid, in a mold of the size and shape desired in the ultimate porous composition. The mold is then heated to a temperature at which the vinyl chloride copolymer mixture is quite fluid and at which the blowing agent is unstable. The particles of blowing agent uniformly dispersed in the resin mixture decompose and evolve gases which produce uniform size bubbles uniformly dispersed throughout the resin product. The temperatures required to effect the desirable result will vary to some extent, depending upon the copolymer and upon the amount of plasticizer present and the decomposition temperature of the blowing agent. Generally, blowing temperatures of 250 to 400° F. are useful. In this range of temperatures the plasticizer-copolymer mixtures are sufficiently soft to permit the evolution and expansion of the gases generated by the decomposition of the blowing agent mixed therein. The decomposition temperatures of any gas-producing compounds may be increased by slight pressure. Accordingly, some gas-evolving solids which ordinarily decompose at very low temperatures, for example 35 to 50° C., are useful as blowing agents because when compounded with resin mixtures the decomposition is restrained until the resin mixture is soft enough to permit the expansion of the evolved gases.

The blowing agents used in the practice of this invention are compounds, usually stable solids at room temperatures, which decompose when subjected to the elevated temperatures at which the sponges are blown. Although any compound which evolves a gas when heated to elevated temperatures may be used, the more desirable compounds are those which do not form residues upon decomposition which will interfere with subsequent operations or develop undesirable physical and chemical properties in the ultimate sponge composition. Generally compositions which decompose to form odorless and non-toxic gases are preferred. Thus, blowing agents which decompose to form carbon dioxide or nitrogen are very valuable in the practice of this invention. In the preferred class of this invention, the bicarbonates of sodium, potassium, calcium, bismuth and other metals, metallic oxalates and formates, such as calcium oxalate, manganese oxalate and sodium formate, and diazo compounds, such as amino-di-azo-benzene. Other useful blowing agents are the ammonium compounds, such as ammonium carbonate, ammonium bicarbonate, ammonium benzoate, ammonium nitrate and ammonium sulfite, the nitric and nitrous acid salts, such as calcium nitrate and barium nitrite, and various metallic carbamates. The blowing agent, or a mixture of two or more of said agents, is incorporated with the vinyl chloride polymer and a liquid plasticizer on a roll mill or other convenient mixing device. The composition may be warmed slightly to facilitate mixing, but the temperatures should not exceed the minimum temperature at which the gas evolution or "blowing" takes place. Generally warming should be avoided when the more volatile blowing agents, such as ammonium bicarbonate, are used. The quantity of blowing agent will determine the density of the ultimate sponge composition and the size and number of gas cells in the resin mass. Although generally any quantity of agent may be used, the compositions containing very few gas cells are not substantially different from the unblown compositions while the use of large quantities produces weak structures with more or less continuous gas interstices. The most desirable and valuable compositions are produced by using from 0.5 to 10 percent by weight based on the mixture of vinyl chloride polymer and acetal.

The blowing operations are most conveniently conducted in a mold or press which is provided with wall conduits for the circulation of steam and cooling water. Steam of pressure required to provide the desired blowing temperatures is used to expand the composition and cold water is subsequently used to set the sponge composition and to expedite the cooling of the mold.

The copolymers are plasticized by the addition of liquid materials which are solvents for the vinyl chloride copolymers. Suitable solvents are the high-boiling esters, ethers and ketones, including tricresyl phosphate, dibutyl sebacate, diamyl phthalate, dibutyl ether, dibutyl ketone, butyryl phthalyl butyl glycolate, methoxyethyl sebacate, and ethylene glycol bis(butyl carbonate). The plasticizer is generally added in amounts between 50 and 150 percent of the weight of the polymer and preferably between 60 and 125 percent. The optimum proportion will vary somewhat for each specific copolymer but may readily be determined by heating a sample of the polymer to a temperature within the blowing range and adding measured quantities of the plasticizer until the softened polymer begins to flow at 250° F.

Generally, the residue from the blowing agent is basic in its chemical properties. This basicity may be objectionable by reason of the increased water-absorption of the vinyl resin. Under such conditions it may be desirable to add solid acids, such as stearic acid, oleic acid, or other high molecular carboxylic acids to react with the free bases formed during the blowing operations.

The sponge compositions may be filled or mixed with solid compositions which strengthen, color, or otherwise modify the physical properties thereof. These compositions include calcium silicate, magnesia, calcium carbonate, talc, titanium dioxide or colored pigments, such as lead chromate, or fibrous materials, such as asbestos, glass fiber, cotton floc or other vegetable fibers. Stiffening agents, such as finely divided glass, fuller's earth or diatomaceous silica, and inert fillers, such as sawdust, cork or gypsum, may be added. If desired, fire-proofing compositions, such as chlorinated diphenyl, may be included to increase the temperature of combustion. Suitable dyes may also be added to produce any desired color in the porous vinyl composition.

The new compositions are light in weight, soft and elastic. They may be used as heat and sound-proofing materials of construction, or as padding under floor coverings and as substitutes for natural sponges.

Further details of the practice of this invention are set forth in the following specific examples.

Example 1

A copolymer of 90 percent vinyl chloride and 10 percent diethyl fumarate was mixed on a roll mill with the following compounds, the proportions indicated being expressed as parts by weight based on 100 parts by weight of the copolymer.

| Compound: | Parts by wt. |
|---|---|
| Dibutyl sebacate | 100 |
| Stearic acid | 40 |
| Calcium carbonate | 12.5 |
| Sodium carbonate | 18.75 |

The mixture was prepared by warming the copolymer on the mill and adding the plasticizers and the stearic acid. The pigment was then mixed thoroughly with the plasticized copolymer and finally the sodium bicarbonate was added. After thoroughly blending the ingredients while taking adequate precaution to prevent heating during the milling operation, the stock was sheeted and cut to convenient size for inserting in a mold 22 inches by 22 inches by 0.75 inch in size. The mold was provided with conduits in the side walls and piped for steam and cold water. The mold was then heated to 340° F. for 20 minutes. Cold water was then run through the mold for the purpose of cooling to facilitate handling and to set the thermoplastic sponge composition so prepared. Upon opening the mold a uniform soft composition was obtained.

*Example 2*

Using the procedure of the preceding example and the identical formulation except for the substitution of a copolymer of 90 percent vinyl chloride and 10 percent diethyl chloromaleate, another porous composition which was exceptionally pliable and elastic was obtained.

In this specification and the appended claims all percentages are by weight based on the weight of the copolymer, unless otherwise indicated.

Although the invention is described with respect to specific embodiments thereof, it is not intended that the details shall be construed as limitations upon the scope of the invention except to the extent incorporated in the following claims.

*Addendum*

In the structural formula set forth in column 2, the R radical may be any alkyl group, but preferably one of lower molecular weight such as methyl, propyl, butyl, amyl and especially ethyl.

I claim:

1. A light weight, soft and elastic sponge composition comprised of a copolymer of 2% to 25% of an alkyl ester of an acid having the structural formula

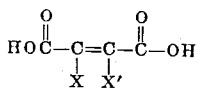

in which X and X' are an atom of the group consisting of hydrogen and chlorine, and 75% to 98% of vinyl chloride, and containing 50% to 150% (based on the weight of the copolymer) of a liquid plasticizer which is a solvent for the copolymer, the sponge having gas filled cells dispersed therein.

2. A light weight, soft and elastic sponge composition comprised of a copolymer of 2% to 25% of an alkyl ester of an acid having the structural formula

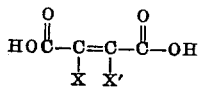

in which X and X' are an atom of the group consisting of hydrogen and chlorine, and 75% to 98% of vinyl chloride, and containing 60% to 125% of dibutyl sebacate (based on the weight of the copolymer), the sponge having gas filled cells dispersed therein.

3. A light weight, soft and elastic sponge composition comprised of a copolymer of 2% to 25% of an alkyl ester of an acid having the structural formula

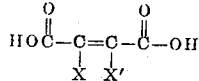

in which X and X' are an atom of the group consisting of hydrogen and chlorine, and 75% to 98% of vinyl chloride, and containing 60% to 125% of tricresyl phosphate (based on the weight of the copolymer), the sponge having gas filled cells dispersed therein.

4. A method of preparing a light weight, soft and elastic sponge composition which comprises mixing a copolymer of 2% to 25% of an alkyl ester of an acid having the structural formula

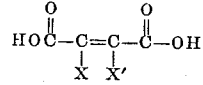

in which X and X' are an atom of the group consisting of hydrogen and chlorine, and 75% to 98% of vinyl chloride with 50% to 150% (based upon the weight of the copolymer) of a liquid plasticizer which is a solvent for the copolymer, and 0.5% to 10% of a gas evolving solid, and heating the mixture in a mold to a temperature at which the copolymer mixtures becomes fluid and at which the solid becomes unstable.

WALTER T. L. TEN BROECK, Jr.

REFERENCES CITED

The following references are of record in the file of this patent:

UNITED STATES PATENTS

| Number | Name | Date |
|---|---|---|
| 2,386,995 | Wigal | Oct. 16, 1945 |
| 2,416,874 | Howk et al. | Mar. 4, 1947 |

FOREIGN PATENTS

| Number | Country | Date |
|---|---|---|
| 429,316 | Great Britain | May 28, 1935 |